Jan. 29, 1946.  J. EATON  2,393,599
CONDITION RESPONSIVE CONTROL SYSTEM AND APPARATUS
Filed March 1, 1943
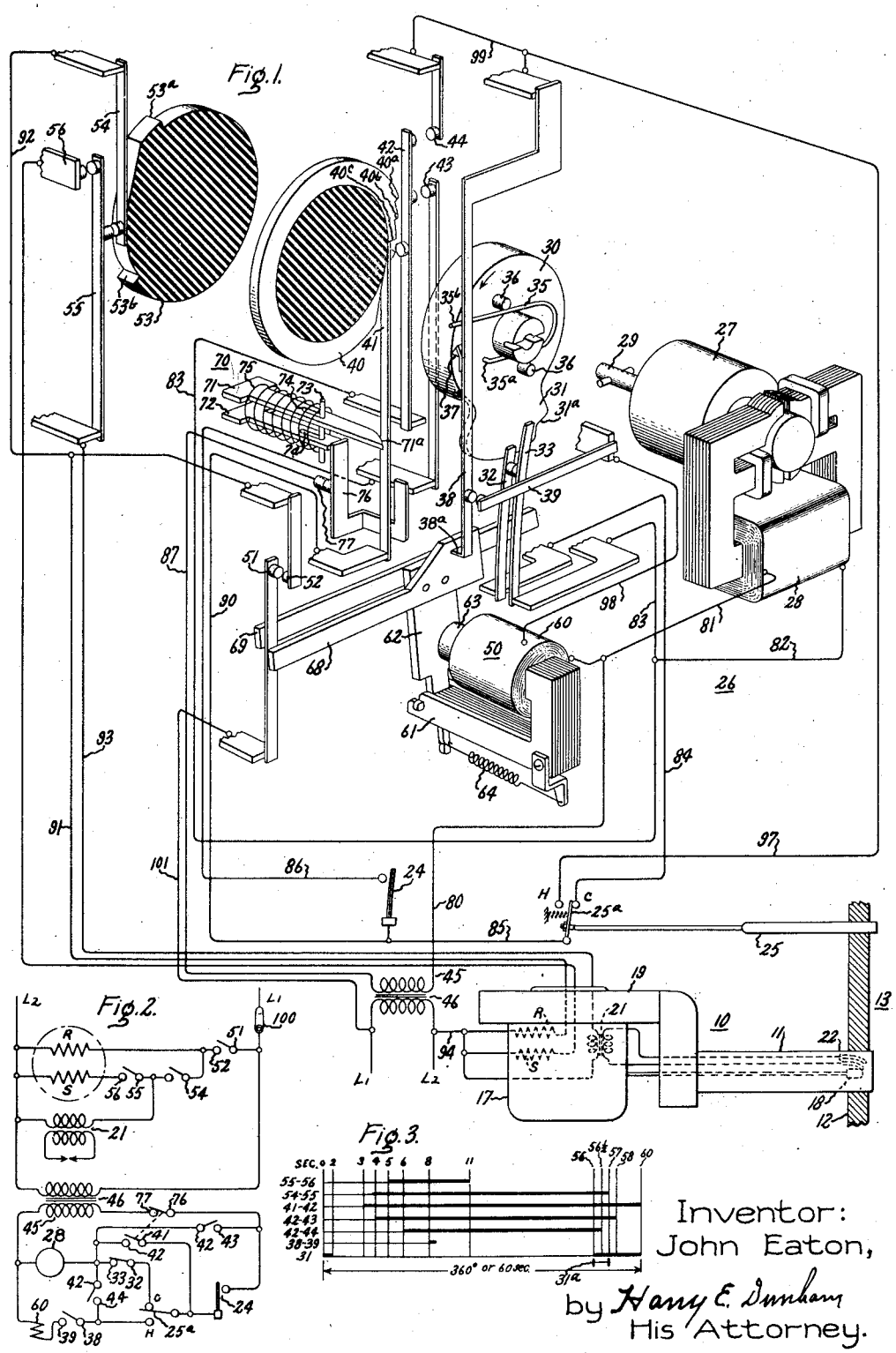
Inventor:
John Eaton,
by Harry E. Dunham
His Attorney.

Patented Jan. 29, 1946

2,393,599

UNITED STATES PATENT OFFICE 2,393,599

CONDITION RESPONSIVE CONTROL SYSTEM AND APPARATUS

John Eaton, Schenectady, N. Y., assignor to General Electric Company, a corporation of New York Application March 1, 1943, Serial No. 477,528

18 Claims. (Cl. 158—28)

The present invention provides improvements in control systems and apparatus, particularly of the automatic sequential condition responsive type involving a predetermined sequence of control conditions wherein the automatic establishment of one critical condition is a prerequisite to controlling or maintaining another condition.

The improvements of the present invention are of particular advantage in automatically controlling oil burners or the like to establish and maintain combustion in thermostatic heating control service although not necessarily limited thereto.

My Patent 2,278,252, granted March 31, 1942, describes and claims a control system and apparatus wherein an electrically operated time sequencing switch mechanism combined with an electromagnetic relay and a control lockout mechanism under the joint control of the timer and the relay coordinates and sequences the operation of various elements of an automatic condition changing device such, for example, as an automatic burner or the like so as to insure proper and safe operation of the condition changing device under normal operating conditions, as well as to prevent continued operation thereof under various abnormal conditions. In such service the sequence controlling apparatus is operated under the joint control of a master condition responsive device, such as a room thermostat or the like, and a prerequisite condition responsive device, such as a combustion responsive switch or the like, and, if desired, also under the control of a plurality of limit or safety switches each responsive to a different abnormal condition of the condition changing apparatus.

The principal object of the present invention is to provide a more safe, positive and reliable control system and apparatus suitable for automatic prerequisite condition responsive control of burners or other condition changing apparatus.

A particular object is to provide an improved automatic control lockout mechanism that is operated under the joint control of an electrical timer and relay to prevent continued automatic operation of the condition changing apparatus when a predetermined prerequisite condition is not automatically established at a predetermined time during the starting of operation of the condition changing apparatus. The control lockout mechanism disclosed in my Patent 2,278,252 involves a pair of relatively movable lockout control members operated by the timer and biased into a predetermined relative position which is automatically changed during the operation of the sequence control apparatus. The improved control lockout mechanism of the present invention effectively eliminates such relatively movable lockout control members, together with the possibility of sticking or mispositioning thereof that may occur in service, and thereby provides a more safe, positive and reliable control.

Another object is to provide an improved transient form of relay pick-up control to enable the electrical sequence timer to initially energize the electromagnetic relay at a critical time, while eliminating the possibility of the timer maintaining the relay initial energizing circuit closed in case of mechanical or electrical failure or stalling of the timer at the critical time. In this way a more safe, positive and reliable control is provided since there is no danger of continued operation of the burner or other condition changing apparatus in case such accidental failure of the sequence timer should occur.

A further object is to provide an improved circuit connection arrangement for coordinating the improved control lockout contact mechanism and the improved relay transient pick-up mechanism with the electrical timer and electromagnetic relay in the automatic condition responsive control system.

A still further object is to provide an improved form of manually operable and automatically released restart control switch mechanism for reestablishing the automatic operation of the improved prerequisite condition responsive control system and apparatus after an automatic control lockout has occurred due to a failure to obtain the prerequisite condition at the critical time in the control sequence. With the manual restart control arrangement shown in my prior Patent 2,278,252 it was necessary to manually maintain the restart button depressed until after a predetermined critical point in the starting timed sequence has been reached. The improved restart control mechanism of the present invention requires only a momentary manual operation and thereafter automatically resets itself when the proper time in the starting sequence is reached.

Further specific objects and advantages of the present invention will appear in the following description of the accompanying drawing illustrating the preferred embodiment thereof and in which Fig. 1 is a schematic diagram showing the various elements of the improved electrical sequence timer and electromagnetic relay combination with the improved control lockout, relay transient pick-up, and automatic restart control mechanisms, together with the improved circuit interconnection thereof with the master automatic control switch and the prerequisite condition control switch applied to control an oil burner of the electric motor driven and electrically ignited type; Fig. 2 is a simplied circuit diagram for enabling a better understanding of the main burner sequential energizing circuits and the various sequence control, interlocking, lockout, pick-up and restart circuits to be obtained; and Fig. 3 is a time sequence diagram indicating the relative time of sequential operation of the various cam operated and relay operated switches that occurs during the automatic starting into operation of the improved prerequisite condition responsive control system and apparatus.

Referring to Fig. 1, the improved prerequisite condition responsive control system and apparatus of the present invention may be applied to automatically control the operation of any well known form of automatic oil burner 10 having a burner nozzle 11 mounted in the combustion chamber wall 12 of a furnace 13 that may be of the type suitable for supplying heat for house heating service. The oil burner 10, as shown is of the improved type more fully disclosed in the Macchi Patent 2,325,964 and having its oil and air pumping mechanism enclosed within a sump 17 and interconnected with the burner oil atomizing nozzle 18 and driven by an electric motor indicated schematically in the drawing as provided with a running winding R and a starting winding S. A combustion air blower 19 is also operated by the driving motor to supply combustion air through the air nozzle tube 11 that surrounds the oil nozzle 18. The oil and air mixture is automatically ignited by means of the ignition transformer 21 and the ignition electrodes 22 to establish combustion within the combustion chamber of the furnace 13. It will be understood, however, that any other form of oil burner or other prerequisite condition changing apparatus may be controlled by the improved control system and apparatus of the present invention, if desired.

The oil burner 10 is started and maintained in operation under the joint control of the master control switch 24 and prerequisite control switch 25, the former being responsive to a predetermined temperature condition such as room temperature that is regulated by the operation of burner 10 and the latter being responsive to both the absence and the presence of combustion in the combustion chamber of furnace 13.

The improved automatic sequence timing control mechanism indicated generally by the reference character 26 is operated under the joint control of the condition responsive switches 24 and 25 and comprises an electrical sequence timer 27, shown as an electric motor of the synchronous alternating type having an energizing winding 28 and a slow speed shaft 29 for driving the sequence timing cam 30 that, for the sake of clearness in the drawing, is shown separated into three sections although actually it may be formed of suitable molded material in one piece. The timer cam 30 is provided with an integral rotating lockout control key 31 for selectively controlling the operation of the two lockout switch elements 32 and 33 at different intervals in the time sequence. The cam 30 is also provided with a relatively movable relay pick-up operating finger 35 shown in the form of a resilient looped spring element having one end 35a thereof secured to the cam 30 with the spring disposed to be engaged by the anchor pins 36 so as to move the free end 35b of the operating finger into engagement with the inclined face of the cam 37 carried by the relay pick-up switch element 38 and thereby move the element 38 into circuit closing engagement with the cooperating element 39 at a predetermined time in the rotation of the sequencing cam 30 in the counterclockwise direction, as indicated by the arrow.

The timer cam 30 also is provided with a sequencing cam surface 40 for effecting sequential circuit closing engagement between the interlocking control switch elements 41, 42 and also the circuit closing engagement of the latter with the cooperating contacts 43, 44, as well as the circuit opening disengagement thereof at predetermined times by means of the cam steps 40a, 40b and 40c. This group of sequentially operated interlocking contacts are all energized from the low voltage winding 45 of the transformer 46 having its primary energized from the power supply lines L1, L2, and cooperate with the master control switch 24 and the prerequisite condition responsive control switch 25 in controlling the operation of the electrical timer 27 and the electromagnetic relay 50.

The timer cam 30 also is provided with a sequencing cam surface 53 for sequentially moving the oil burner motor control movable switch elements 54, 55 and the cooperating contact 56 to control the energization circuits of the ignition transformer 21 and the motor starting winding S from the supply lines L1, L2 both before and after the electromagnetic relay 50 is picked up and closes its main circuit controlling contact 51 with the cooperating stationary contact 52 to energize the motor running winding R.

The improvements of the present invention enable all of the movable switch elements, both of the interlock and the main oil burner circuit controlling type, to be formed of elongated resilient strips of a suitable metal with one end thereof firmly anchored to a supporting piece that can be fixedly mounted in a base (not shown) preferably of a molded form and provided with simple means for securing the anchoring pieces thereto, which is of material advantage in constructing and servicing the control apparatus.

The electromagnetic relay 50 is shown as of the alternating current type having the energizing winding 60 for magnetizing the laminated magnetic frame 61 which pivotally supports the movable armature 62 in attractive relation with the pole 63 that preferably is provided with a pole shading winding. Armature 62 is biased to the position in which it is shown by the spring 64. The movable armature 62 carries the operating arms 68 and 69, preferably riveted thereto, for operating not only the main oil burner energizing switch 51, but also the lock-out contacts 32, 33 and the pick-up contact 38.

The improved manual restart mechanism indicated generally by the reference character 70 comprises a pair of jointly manually operable elements 71 and 72 disposed in overlapping sliding relation with the stop pin 73 extending through suitable slots 74 provided in the elements 71 and 72 and with the biasing spring 75 interpositioned between the pin 73 and the enlarged manual operating heads of the elements 71, 72 for biasing the element 71 to the position in which it is shown in the drawing when element 72 is manually released. The tapered end 71a of element 71 engages with the interlocking movable switch element 41 so as to move this element into circuit closing engagement with the switch element 42 independently of the cam 40 when the two reset elements 71, 72 are both manually depressed. Upon manual operation, element 72 directly engages with a movable switch element 76 so as to disengage it from the cooperating stationary contact 77. Thus when the two elements 71, 72 are jointly manually released, the element 71 remains in its operated position in engagement with the contact 41 due to the friction therebetween being made greater than the force of the return biasing spring 75. But element 72 is immediately returned to its initial position since the switch 76 is normally biased into engagement with the cooperating contact 77. Only when cam 40 operates normally to disengage the switch element 41 from the depressed restart element 71 is the latter then free to return to its initial position by the bias of spring 75.

Operation

Whenever the master control thermostat 24 closes its contacts, an energizing circuit for starting operation of the timer 26 is closed. This circuit may be traced from the transformer secondary 45 through conductors 80 and 81, the timer energizing winding 28, conductors 82 and 83, the normally closed lockout contact switch elements 32, 33, conductor 84, the contact of the prerequisite condition responsive switch 25 in its cold position C in which it is shown, conductor 85, master switch 24, conductor 86, the normally closed restart switch contacts 76, 77, and conductor 87 to the other terminal of the transformer winding 45. As a result, the shaft 29 of the timer 28 starts to rotate at a relatively slow speed, preferably 1 R. P. M. This drives the sequencing cam 30 in a counterclockwise direction, as indicated by the arrow from its zero or start position in which it is shown in Fig. 1 and which is correspondingly indicated in Fig. 3. Thereupon, as indicated at the point 2 in the schematic diagram of Fig. 3, the lockout key 31 moves to disengage the lockout contact 32 and thereby release both of the resilient lockout switch elements 32, 33 for movement as a unit across the path of the key 31 to the position on the opposite side thereof in which the two resilient lockout switch elements 32, 33 are normally biased into such closing engagement. Then at point 3, indicated in the time sequence diagram of Fig. 3, the cam 40 operates the interlock switch element 41 into engagement with the switch element 42. This closes the No. 1 interlock circuit which as more clearly shown in Fig. 2 is connected in shunt around the lockout contacts 32, 33 and the contacts 25a of the flame detector switch in its cold position, this circuit being traced in Fig. 1 from the lockout switch contact 33 through conductor 83, interlock switch elements 42, 41, conductor 90 to conductor 85 and the movable condition responsive switch element 25a. This No. 1 interlock circuit insures that the timer 27 remains energized even though, for some unexplained reason, either the lockout switch contacts or the flame detector switch 25a should accidently open. Also, as described hereinafter, this No. 1 interlock circuit can be manually closed to restart operation of the timer 27 after an automatic lockout has occurred, or an accidental movement of the flame detector contactor 25a from its cold position has occurred.

At the point 4 in the sequence diagram of Fig. 3 the cam 53 effects engagement between contacts 54 and 55 to interconnect through the conductors 91, 92, and 93 one terminal of the motor running winding R with one terminal of the primary winding of the ignition transformer 21, the other terminal of each being permanently connected to the supply line L2 by conductor 94. However, neither the motor nor the transformer winding can be energized until the relay 60 is energized.

Likewise, at point 4 in the time sequence diagram of Fig. 3, cam 40 moves both of the switch elements 41 and 42 bodily as a unit to engage the latter with the switch element 43 thereby to close the No. 2 interlock circuit extending from the left-hand terminal of transformer winding 45 through conductor 87, the normally closed restart switch elements 76, 77, the engaging switch elements 43, 42, conductor 83, and thence through conductor 82, the timer energizing winding 28, and conductors 81 and 80 to the other terminal of the transformer winding 45. This No. 2 interlock circuit controlled by the interlock switch elements 42, 43 serves to maintain timer winding 28 energized entirely independently of the master control switch 24, the condition responsive switch 25a in its cold position and the normally closed lockout switch elements 32, 33.

At point 5 in the time sequence diagram of Fig. 3, the cam 53 moves both the switch elements 54 and 55 bodily as a unit so as to effect engagement between the element 55 and the stationary contact 56 thereby interconnecting one terminal of the motor start winding S with the interconnected terminals of the motor running winding R and the primary of the ignition transformer 21 so that all of these windings will be energized to initiate operation of the burner as soon as the energizing winding 60 of the electromagnetic relay is energized to close switch elements 51 and 52.

Relay pick-up operation

At point 6 in the time sequence diagram of Fig. 3, the cam 40 operates the switch elements 41, 42, 43 bodily as a unit so as to effect engagement between the switch element 42 and the stationary contact 44 thereby setting up a No. 3 interlock circuit preparatory to a transient energization of the relay winding 60 under the control of the resilient operating spring 35. The No. 3 interlock circuit energizes through conductor 99 the resilient movable pick-up switch element 38, and through conductor 97 the contact H of the flame detector switch 25.

Just before point 8 in the time sequence diagram of Fig. 3, the yielding pick-up operating spring 35 is strained by engagement with cam 37 until stopped by the anchor pins 36 that then firmly press the end 35b of the spring against the sloping face of cam 37 carried by the pick-up switch element 38 with sufficient force to move this element so as to effect engagement between the two flexible pick-up switch elements 38 and 39 at point 8. This closure of the pick-up switch elements 38 and 39 by spring 35 is only transient as it at once effects energization of the operating winding 60 of the electromagnetic relay to pick up its armature 62, one terminal of the relay winding 60 being energized directly from the transformer winding 45 through conductor 80, while the other terminal is energized through conductors 98, the transiently closed pick-up switch elements 39, 38, conductor 99, the engaged interlock switch elements 44, 42, 43, the normally closed reset switch contacts 76, 77, and conductor 87.

When the relay armature 62 is picked up, it performs a plurality of control functions as it moves from its unattracted position in which it is shown to the attracted position in which it is held by the operating electromagnet. In the first place, the pick-up control of spring 35 is rendered transitory since the arm 68 engages with the bent over end 38a of the pick-up switch element 38 and thereby moves the cam 37 out of the path of the resilient pick-up spring 35. This permits the strain produced in the resilient spring 35 upon its initial engagement with the cam 37 to be released by a forward movement of the end 35b of the spring out of range of the pick-up switch operating cam 37. Consequently, even though the timer 37 should happen to fail or stall at the particular instant when the spring pressed cam engagement between the pick-up switch elements 38 and 39 is effected to pick up the electro-magnetic relay, nevertheless the actuating resilient pick-up spring 35 is immediately rendered unable to block the disengagement of the pick-up switch elements 38, 39 when the electromagnetic relay is deenergized. This provides an improved safety feature over the condition responsive control of my prior patent.

A second control function effected immediately upon pick-up energization of the electromagnetic relay 50 is the movement by arm 69 of the lockout contacts 32, 33 bodily as a unit from one side of the path of the lockout key 31 to the other side of this path, thereby enabling the selective lockout action to be obtained as described hereinafter.

A third control function effected immediately upon energization of the electromagnetic relay 50 is the closure by arm 69 of the main relay switch elements 51, 52. As a result the motor running winding R is energized through a circuit extending from the supply line L2 through conductor 94 and the furnace boiler pressure, temperature, or other limit switches 100, the running winding R, conductor 101 to the supply line L1 while the motor starting winding S and the ignition transformer primary winding are energized through the circuits previously established by the engagement of the cam actuated switching elements 54, 55, and 56 as described above.

With both the burner motor running winding R and starting winding S and the primary winding of the ignition transformer 21 energized as just described, the operation of the oil burner 10 is initiated immediately following the point 8 in the time sequence diagram of Fig. 3, and is continued whether combustion is successfully established or not until the lockout interval 31a between the time points 56 and 57 occurs. However, at the point 11 the step 53a in the cam 53 is reached so as to disengage the switch element 55 from the contact 56 and thereby deenergize the motor starting winding S while still maintaining engagement between the switch elements 54, 55 to continue energization of the ignition transformer 21.

Thus during the interval between point 11 and point 56, the oil burner 10 is maintained in operation to supply a combustible mixture of atomized oil and air from the burner nozzle 11 into the combustion chamber of the furnace 13 with an ignition arc maintained between the electrodes 22 by the ignition transformer 21 so as to enable combustion to be established. If during this interval 11—56 combustion is successfully established, the flame responsive switch 25 responds to shift its contact 25a from the cold contact C to the hot contact H. This establishes a running circuit for maintaining the electromagnetic relay winding 60 energized under the joint control of the master control switch 24 and the combustion responsive switch 25 and, entirely independent of all of the time sequence control contacts operated by the timer 28, except the transient pick-up contacts 38 and 39 which, however, are independently held in circuit closing engagement by the electromagnetic relay itself. This running circuit may be traced from the transformer winding 45 through conductor 87, normally closed reset contacts 77, 78, conductor 86, the closed contacts of master switch 24, the contact 25a of the flame responsive switch 25 in engagement with its hot contact H, conductor 25 through conductor 97, the engaged pick-up switch elements 38, 39, conductor 98, relay winding 60, and conductor 80 to the other terminal of the transformer winding 45.

In case normal combustion is once successfully established and maintained throughout the lockout period 31a between the points 56 and 57, then the relay operating winding 60 will be maintained energized even though the No. 3 interlock circuit is opened by the disengagement of the interlock switch element 42 from the stationary contact 44 when the interlock switch element 41 drops into the step 40a on the cam 40 at point 56½ in the sequence diagram. Then at point 57 in the sequence the abrupt step 53b is reached in the cam 53 so as to disengage switch element 54 from the switch element 55 thereby deenergizing the ignition transformer 21. At the point 58 switch element 41 drops over the step 50b in the cam 40 to disengage the switch elements 42, 43 thereby opening the No. 2 interlock circuit, and finally at the point 60, which indicates that a complete revolution of the time sequencing cam has occurred, interlock switch element 41 drops over the step 40c in the cam 40 to open the No. 1 interlock circuit and thereby deenergize the operating winding 28 of the timer upon the return of the sequence timing cam 30 to its initial position. The operation of the oil burner 10 normally continues until the master control switch 24 opens its contacts when the desired temperature condition is obtained thereby deenergizing the relay winding 60. As a result, relay armature 62 returns to the position in which it is shown in the drawing to open the main burner switch elements 51, 52 thereby opening the circuit of the running winding R of the burner driving motor. At the same time, the pick-up switch element 38 disengages the element 39 while the lockout switch elements 32, 33 move bodily as a unit until element 32 engages with the lockout key 31 in the position illustrated in Fig. 1. In this way all the parts of the control are returned to their initial positions.

If, instead of the master control switch 24 opening its contacts to stop the burner operation, the deenergization of relay winding 60 is produced by either a failure of the electric power supply lines L1, L2 or by the disengagement of the flame detector switch contact 25a from its hot contact H indicating a failure of combustion, then upon the return of electric power and the closure of the flame detector switch contact 25a with its cold contact C the timer 28 will be reenergized. Consequently in either case the control will automatically recycle to restart operation of the oil burner 10 in precisely the same manner as previously described.

*Lockout operation*

If during any time sequencing starting cycle of the burner, for some reason, combustion should fail to be established successfully during the interval between the points 8 and 56½, or fail to be maintained until point 57 is reached, then the lockout switch mechanism will operate in the following manner. At point 56½, the lockout key 31 has been rotated by the timer 28 so as to bring the notched portion 31a into the path of movement of the end of the lockout switch element 33 and thereby mechanically block the return movement of this lockout switch element 33 from the front side of the key 31 to the opposite side, while permitting free movement of element 32 from the front side of the key 31 to the other to occur through the notch 31a. Thus when the interlock switch 42—44 opens at the point 56½ and deenergizes the relay operating winding 60 to permit the return of the relay armature 62 to the position to which it is biased by spring 64, as shown in Fig. 1, then the normally closed lockout switch elements 32, 33 will be separated and maintained separated with switch element 33 on the front side of the lockout key 31 and the switch element 32 on the opposite side of the key 31 when the timer 28 is deenergized at point 60. In this case, all of the parts except lockout switch element 33 are returned to their initial positions in which they are shown in Fig. 1.

After such lockout operation, the whole automatic control apparatus 26 is unable to effect any further operation of the oil burner until manual operation of the restart members 71, 72 occurs.

*Restart operation*

After a lockout, the automatic operation of the control apparatus 26 can be re-established by a joint momentary manual operation of the two restart elements 71, 72. As previously pointed out, the element 71 will be held in its depressed position by frictional engagement with the interlock switch element 41 until the friction is removed by the normal cam operation of the interlock switch element 41 that occurs during the starting sequence.

The separation of the normally closed switch elements 76, 77 by the manual operating element 71 serves to open all the energizing circuits for the timer 28 and relay 60, thereby rendering the whole control 26 inoperative in case some unskilled person should unwittingly attempt to permanently block the two restart elements 71, 72 in their depressed positions in an endeavor to avoid all automatic lockout operation and the resulting trouble of proper manual resetting.

Upon a proper joint momentary manual operation of the two reset elements 71, 72, the normally closed contacts 76, 77 are only momentarily disengaged while the interlock switch elements 41 and 42 are brought into engagement to close the No. 1 interlock circuit which shunts around both the flame detector switch contact 25a and the lockout switch elements 32 and 33 so as to provide an independent restart energizing circuit for the timer operating winding 28. This circuit extends from the right-hand terminal of transformer winding 45 through conductors 80 and 81, timer winding 28, conductors 82 and 83, the engaged interlock switch elements 42, 41, and thence through conductor 90 and the master control switch 24 in its circuit closing position, and conductor 86, the reset switch contacts 76, 77 which are reclosed immediately upon release of the manual reset operating element 72 and conductor 87 to the other terminal of the transformer winding 45. In this way the timer 28 is maintained energized until the lockout key 31 is moved out of blocking engagement with the lockout switch element 33 at point 2 in the sequence chart of Fig. 3. Thereupon the lockout switch element 33 is free to return into circuit closing engagement with the lockout switch element 32 in its normal position on the other side of the path of the lockout key 31 to which it is biased. The manual reset operating element 71 is returned to its normal position to which it is biased, as shown, when interlock switch element 41 is brought into engagement with element 42 at the point 3 in the sequence, thus all parts of the automatic control apparatus are again in their normal operating relation.

While the improvements of the present invention are of particular advantage in automatic prerequisite condition responsive control for oil burners or the like, it will be understood that the invention is not necessarily limited thereto but may be used for controlling a humidifier system in the manner illustrated in Fig. 8 of my Patent 2,278,252 or for controlling other prerequisite condition changing apparatus.

What I claim as new and desire to secure by Letters Patent of the United States is:

1. In combination, an electrically operated sequence control timer having a pair of normally open switches and movable means for closing one of said switches for a limited interval and provided with a relatively movable resilient operating element for engaging the other of said switches to be moved thereby during said interval for closing the other of said switches at a predetermined time during said interval, two energizing circuits for said timer, means including an automatic condition responsive device for closing one of said circuits to initiate operation of said timer, electroresponsive control means connected to be energized upon the simultaneous closure of said pair of switches and provided with means for holding said other switch closed and for moving said other switch to effect relative movement of said resilient operating element, burner means normally rendered effective during energization of said electroresponsive control means and having switching means responsive to the establishment of combustion for maintaining said electroresponsive control means energized jointly with said other switch, a normally closed lockout switch connected in said one energizing circuit and jointly controlled by said electroresponsive means and said timer for opening said one circuit to prevent operation of said timer upon deenergization of said electroresponsive means within a limited period following the end of said interval, manually operable switching means having a restart element movable from one position to another position for closing said other energizing circuit to restart operation of said timer independently of said lockout switch, and automatic reset means rendered effective upon the restarting of operation of said timer for resetting said lockout switch and said restart element.

2. In combination, a sequential condition changing device having an electrically operated sequencing mechanism provided with a starting circuit, a normally closed lockout switch connected in said starting circuit, means operated by said mechanism for opening said lockout switch upon the occurrence of a predetermined abnormal sequence condition and reclosing said switch upon subsequent operation of said mechanism, automatic condition responsive double circuit switching means connected in said starting circuit and having a separate circuit for controlling the sequential operation of said mechanism, a by-pass switch normally operated by said mechanism and connected for shunting said lockout switch and said condition responsive switching means temporarily during the sequence, and multi-part switching means having jointly manually operable parts with one part thereof connected to open said starting circuit upon manual operation thereof and biased to close said circuit upon manual release thereof and another part arranged to close said by-pass switch upon manual operation thereof and maintain said switch closed to restart the operation of said mechanism upon manual release of both said parts, said other part having automatic biasing means rendered effective for resetting said other part upon the normal operation of said by-pass switch by said mechanism.

3. In combination, a sequential condition changing device having an electrically operated sequencing mechanism provided with a plurality of energizing circuits, an automatic lockout switch connected in one of said circuits, a by-pass switch connected in another of said circuits and normally operated sequentially by said mechanism, and a multi-part switching means having jointly manually operable parts with one part thereof connected to open all said energizing circuits upon manual operation thereof and biased to close said circuits upon manual release thereof and another part arranged to close said by-pass switch upon manual operation thereof and maintain said switch closed to restart the operation of said mechanism upon manual release of both said parts, said other part having automatic biasing means rendered effective for resetting said other part upon the normal operation of said by-pass switch by said mechanism.

4. In combination, an automatic electrically operated sequencing control mechanism having a lockout switch operated thereby for preventing automatic operation thereof after the occurrence of a predetermined abnormal sequence condition and having a by-passing switch normally operated sequentially thereby for shunting said lockout switch temporarily during the control sequence of said mechanism, manually operable means for closing said by-passing switch to restart the operation of said mechanism, and automatic reset means rendered effective upon the restarting of operation of said mechanism for resetting said manually operable closing means.

5. In combination, an automatic electrically operated sequencing device having a lockout switch operated thereby for preventing automatic operation thereof after the occurrence of a predetermined abnormal sequence condition and having a switch provided with manually operable closing means and connected for shunting said lockout switch to restart the operation of said mechanism, and automatic reset means rendered effective upon restarting operation of said device for sequentially resetting said lockout switch and said manually operable switch closing means.

6. In combination, an electrical timer having sequentially operated switching means and a movable lockout timing key, electroresponsive means energized under the control of said switching means, a lockout switch mechanism for controlling the energization of said timer and having a pair of switch members biased into circuit closing engagement at one side of the path of movement of said lockout key, means effective upon energization of said electroresponsive device for moving said switch members as a unit to the other side of said path, said key having one portion for engaging one of said switch members upon deenergization of said electroresponsive device at a predetermined time to effect lockout separation thereof and having another portion for engaging the other of said switch members to maintain said members in circuit closing engagement on said other side of said path upon deenergization of said electroresponsive device at a different time.

7. In combination, an electrical sequencing device having a movable lockout timing key, a lockout switch mechanism for controlling the energization of said device and having a pair of switch members biased into circuit closing engagement at one side of the path of movement of said key, automatic means effective upon energization of said device for moving said switch members as a unit to the other side of said path and releasing said members at different times, said key having one portion for engaging one of said switch members upon release of said members at a predetermined time to effect lockout separation thereof and having another portion for engaging the other of said switch members to maintain said members in circuit closing engagement on said other side of said path upon release of said members at a different time.

8. In combination, a movable switch, a timer having a movable resilient operating element for operatively engaging said switch to be moved thereby during a predetermined interval for closing said switch at a predetermined time, and electroresponsive means energized upon closure of said switch for maintaining said switch closed and moving said switch to effect the release of said operating element.

9. In combination, a timer having a resilient switch operating element provided with a stop and a switch disposed in the path of said element to effect the closure of said switch at a predetermined time determined by said stop, and electroresponsive means energized upon closure of said switch for moving said switch out of the path of said element to release said operating element from said stop.

10. In combination, an electrically operated timer having switching means and a movable lockout timing member operated thereby, electroresponsive means energized under the control of said switching means, means including a lockout switch mechanism controlling the energization of said timer, said lockout switch mechanism having a pair of switch members biased into circuit closing engagement at one side of the path of movement of said lockout timing member, means effective upon energization of said electroresponsive device for moving said lockout switch members as a unit to the other side of said path, said movable lockout timing member having a portion for engaging one of said lockout switch members upon deenergization of said electroresponsive device at a predetermined time during the energization of said timer to effect lockout separation of said switch members and thereby deenergize said timer.

11. In combination, an electrical timing control sequencing device having a movable lockout timing member operated thereby, means including a lockout switch mechanism for controlling the energization of said device, said lockout switch mechanism having a pair of switch members biased into circuit closing engagement at one side of the path of movement of said movable lockout timing member, automatic means effective during energization of said device for moving said lockout switch members as a unit to the other side of said path and releasing both said members for movement in accordance with the bias thereof, said movable lockout timing member having a portion for engaging one of said pair of switch members upon release of both of said switch members at a predetermined time during the energization of said electrical control sequencing device to effect lockout separation of said switch members and thereby terminate the energization of said device.

12. In combination, an electrically operated timer having a pair of sequentially operated switches and a movable member for closing one of said switches for a limited interval and provided with a relatively movable resilient operating element for engaging the other of said switches to be moved thereby during said interval for closing said other switch at a predetermined time in said interval, an electromagnet connected to be energized during the simultaneous closure of said pair of switches and provided with means for maintaining said other switch closed and moving said other switch to release said resilient operating element for relative movement thereof out of engagement with said other switch, and a lockout switch jointly controlled by said electromagnet and said timer for preventing operation of said timer upon deenergization of said electromagnet within a limited period following the end of said interval.

13. In combination, an electrically operated sequence control timer having a pair of sequentially operated switches and means for closing one of said switches for a limited interval and provided with a relatively movable resilient operating element for engaging the other of said switches to be moved thereby during said interval for closing said other switch at a predetermined time in said interval, electroresponsive means connected to be energized during the simultaneous closure of said pair of switches and provided with means for maintaining said other switch closed and moving said other switch to release said resilient operating element for relative movement thereof out of engagement with said other switch, and means including a condition responsive switch and said other switch for maintaining said electroresponsive means energized after said interval.

14. In combination, a movable switch biased open, an electrical timer having a movable resilient element for engaging said switch to be moved thereby during a predetermined interval for closing said switch at a predetermined time, means including a condition responsive switch for energizing said timer, electroresponsive means energized upon closure of said movable switch for maintaining said movable switch closed and moving said movable switch to release said resilient element for relative movement thereof out of engagement with said switch, and means including said condition responsive switch and said movable switch for maintaining said electroresponsive means energized independently of said timer.

15. In combination, an electrical timer having a pair of sequentially operated switches and means for closing one of said switches for a limited interval and provided with a relatively movable resilient operating element for engaging the other of said switches to be moved thereby during said interval for closing said other switch at a predetermined time in said interval, and electroresponsive means connected to be energized during the simultaneous closure of said pair of switches and provided with means for maintaining said other switch closed and moving said other switch to release said resilient operating element for relative movement out of engagement with said other switch.

16. In combination, an electrical timer having a rotatable switch operating cam, a switch closed by said cam for a limited interval, a second switch, a resilient element carried by said cam into engagement with said second switch to be moved thereby during said interval for closing said second switch at a predetermined time in said interval, and electroresponsive means connected to be energized during the simultaneous closure of said switches and provided with means for maintaining said second switch closed.

17. In combination, a timer having a movable timing member and a stop carried by said member, a relatively movable switch operating element carried by said timing member and provided with means for biasing said element to a position away from said stop, a switch disposed in the path of said element for moving said element into engagement with said stop to effect the closure of said switch at a predetermined time determined by said stop, and electroresponsive means energized upon closure of said switch for moving said switch out of the path of said element to release said operating element for movement away from said stop.

18. In combination, a timer having a rotatable timing member and a stop carried by said member, a relatively movable switch operating element carried by said timing member and provided with means for biasing said element to a position away from said stop, a switch having an operating cam disposed transverse the path of said element for moving said element into engagement with said stop to effect the closure of said switch at a predetermined time determined by said stop, and electroresponsive means energized upon closure of said switch for maintaining said switch closed and moving said cam transversely out of the path of said element to release said operating element for movement away from said stop.

JOHN EATON.